April 29, 1952     H. A. TEALE     2,594,518

FILTER PRESS PLATE

Filed June 28, 1947     3 Sheets-Sheet 1

INVENTOR.
Harold A. Teale
BY Morgan, Finnegan & Durham
ATTORNEYS.

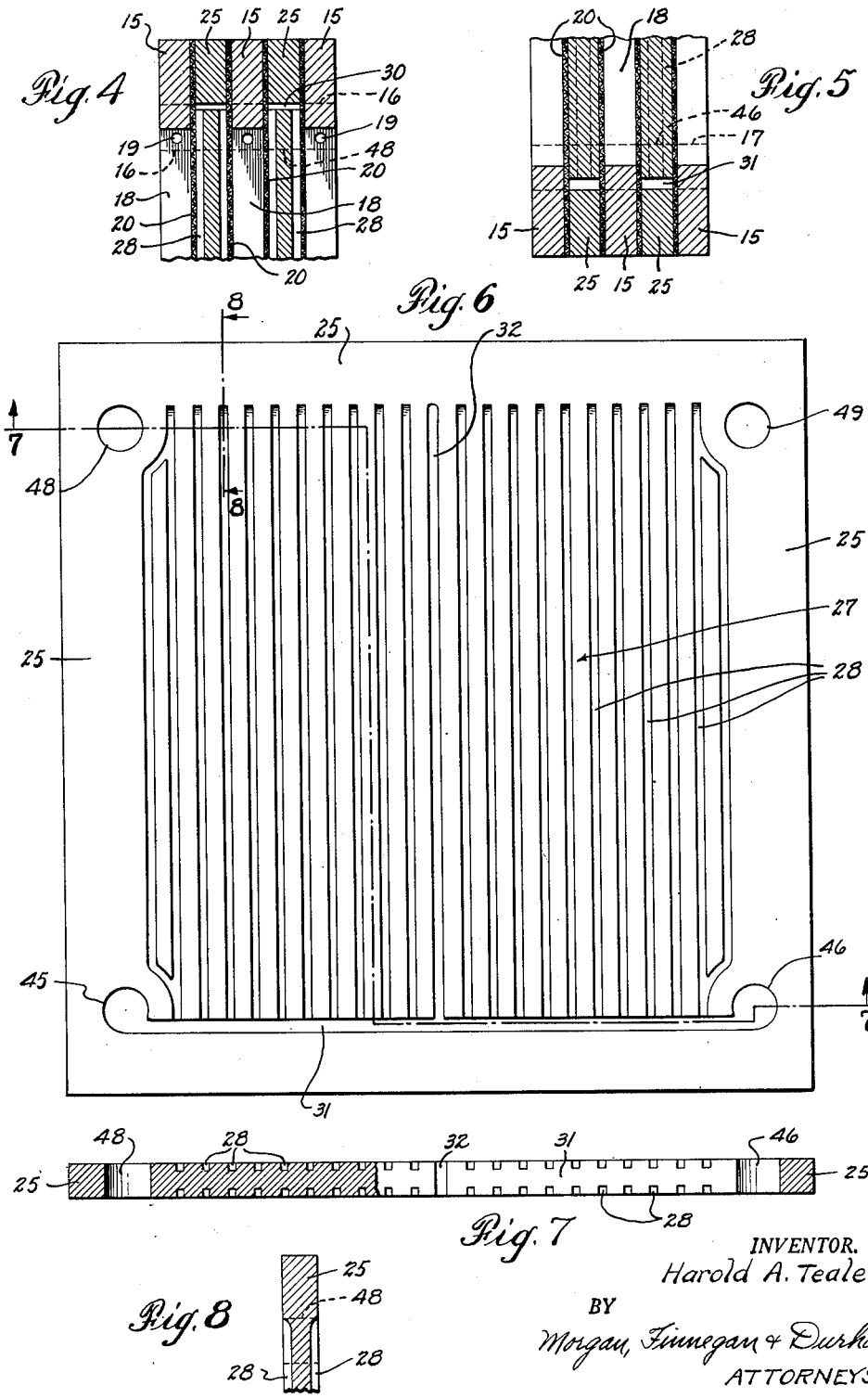

April 29, 1952 H. A. TEALE 2,594,518
FILTER PRESS PLATE
Filed June 28, 1947 3 Sheets-Sheet 3

INVENTOR.
Harold A. Teale
BY
Morgan, Finnegan & Durham
ATTORNEYS

Patented Apr. 29, 1952

2,594,518

UNITED STATES PATENT OFFICE 2,594,518

FILTER PRESS PLATE

Harold A. Teale, Brooklyn, N. Y., assignor to George B. Finnegan, Jr., New York, N. Y., trustee Application June 28, 1947, Serial No. 757,803

2 Claims. (Cl. 210—195)

The invention relates to improvements in filter plates, particularly those used in plate and frame filter presses.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 1:
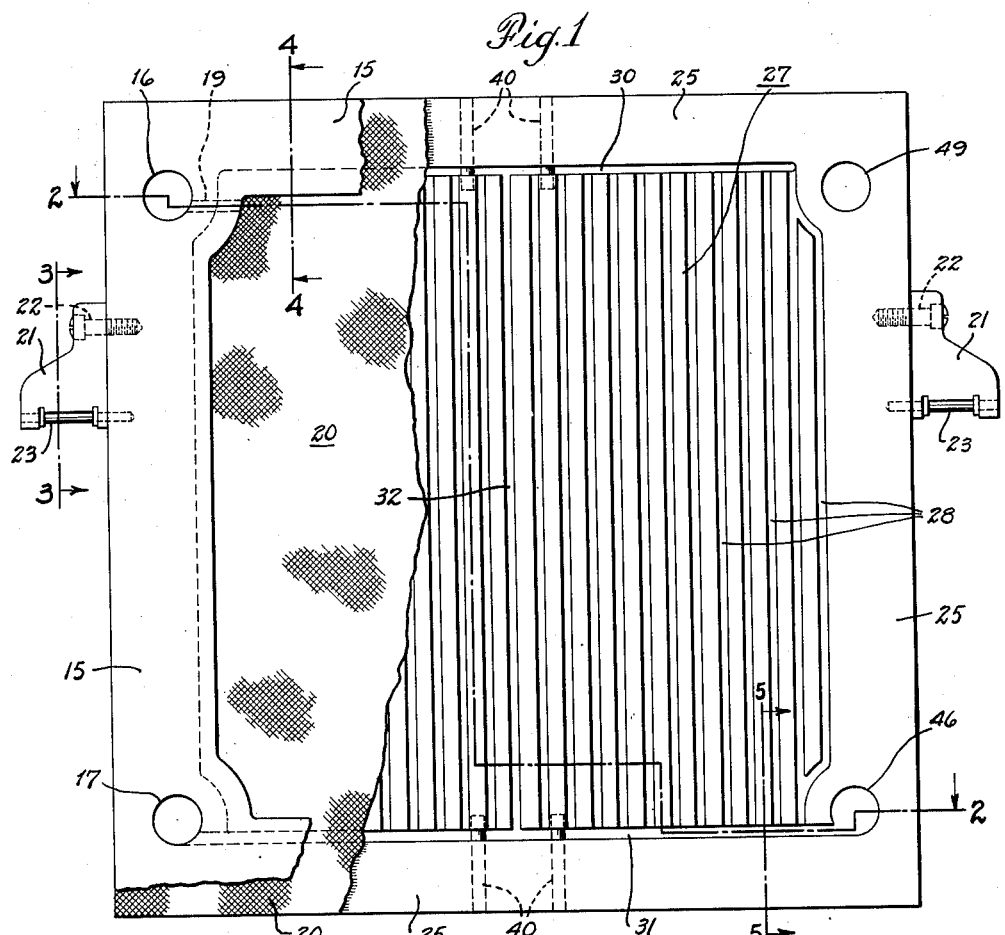
Fig. 1 is a front elevation of a plurality of plates and frames, assembled in cooperative relation, with parts broken away to show details of a plate.
Figure 3:
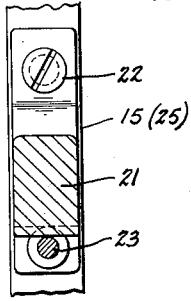
Figure 9:
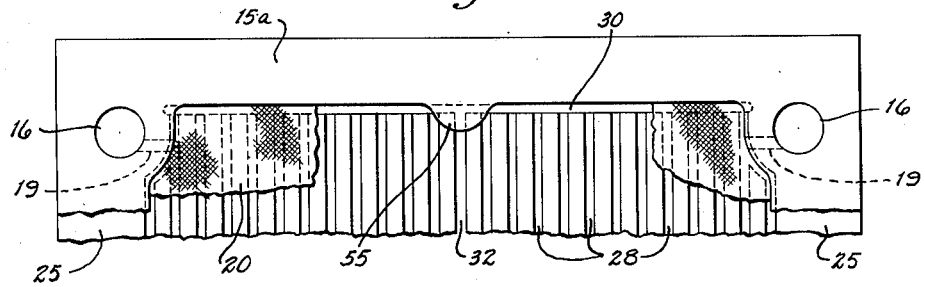
Figure 10:
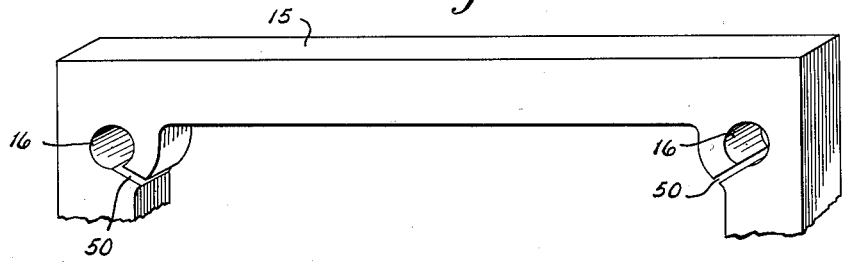
Figure 11:
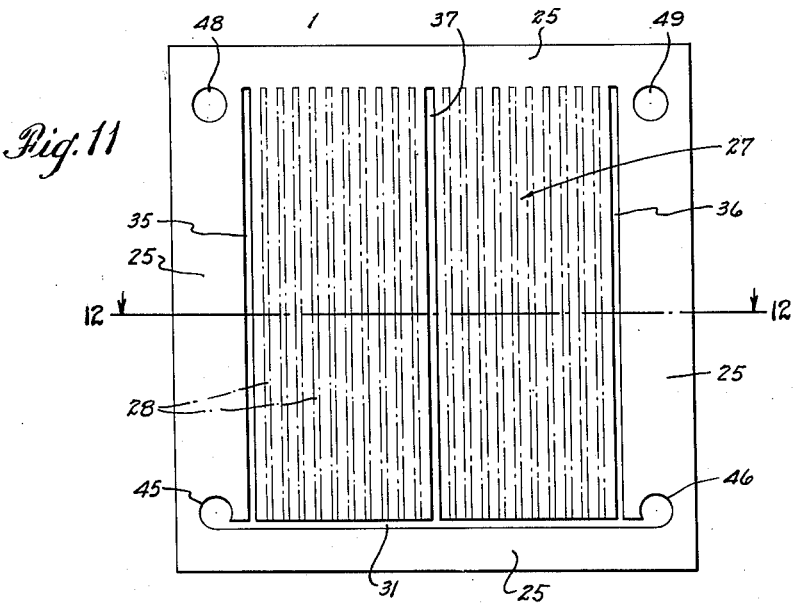
Figure 12:
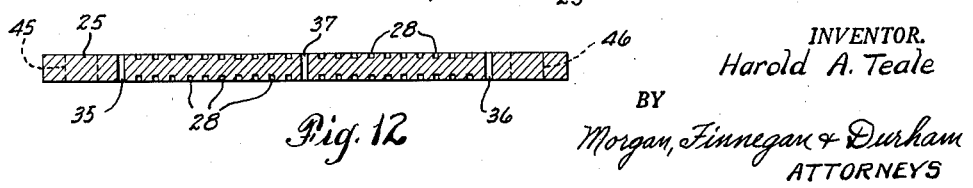

Figs. 3, 4 and 5 are vertical sections on lines 3—3, 4—4 and 5—5, respectively, of Fig. 1;

Fig. 6 is a front elevation of a modified plate;

Fig. 7 is a horizontal section on line 7—7 of Fig. 6;

Fig. 8 is a vertical section on line 8—8 of Fig. 6;

Fig. 9 is a fragmentary front elevation of an assembly similar to that of Fig. 1, showing a modified frame;

Fig. 10 is a fragmentary perspective of the upper part of a frame, showing modified feed ports;

Fig. 11 is a front elevation of a modified plate;

Fig. 12 is a section on line 12—12 of Fig. 11.

In plate and frame filter presses, various materials are used for forming plates and frames, according to the nature of the materials being filtered, and the temperatures and pressures used during the filtration process. While metal plates and frames are common, they cannot be used in many situations, as for example where strong acids or caustics are used in the filtering operation. Consequently other materials such as wood, "Bakelite," and other plastic materials and combinations threof are used, according to the nature of the filtered substances to which they are resistant.

All such materials introduce problems in operation due to their tendencies to swell and shrink because of liquid adsorption and thermal expansion and contraction.

Another problem in filter presses results from uneven hydraulic pressures developed within the press. Such condition usually occurs when the feed of liquor to the space or chamber between two plates is clogged or cut off so that such plates are subjected to severe hydraulic pressures from either side.

Prior attempts to solve these problems have included making the grooved portion of "field" of the filter plate from removable or relatively easily frangible parts which would break when subjected to unusual pressures as those referred to, as disclosed in Van Winkle Patent No. 2,390,628, for example. This expedient avoided destruction of the entire plate by permitting replacement of a portion thereof. Also by leaving some space between the various sections or elements of the field, the problems entailed by expansion, contraction and warping were largely overcome. However, the construction of these prior forms of plates was quite expensive, involving intricate machining and fitting operations requiring costly labor. Also the plates so formed were relatively weak and subject to breakage in handling, shipping, etc.

The object of my invention is to provide a filter plate in which the above-described problems are solved by a novel construction of filter plate formed from a single, integral piece or sheet of material, be it "Bakelite," "Lucite," wood, aluminum or other plastic, fibrous or metal material. I provide a filter plate which may be cut, cast or molded from an integral piece or matrix but which will have a grooved filtration field which can conform to dimensional changes from temperature and moisture and which is able to yield to unusual hydraulic pressures without breakage of the field or plate and without disruption of the filtering operation. These advantages of my novel plate construction also are combined with the desirable feature of a solid or integral, fluid-tight frame or border around the grooved filtration field, said field being an integral part thereof. My plate is inherently stronger than those previously made and can thus be made thinner while having equal or greater filtering capacity; it is also remarkably free from any tendency to buckle under stress, so that it not only is self-protecting but also saves wear and tear and breakdowns or puncturing of the filter media.

Briefly described, my filter plate is formed from a single sheet or block of material, such as laminated "Bakelite," the inner rectangular grooved field being generally an integral part of said block, but being slotted or cut through along certain lines or in certain areas so as to introduce a measure of yieldability or flexible movement into the field area with respect to the surrounding solid border. Thus the inner rectangular field may be vertically slotted along its center and horizontal connecting slots run along the bottom, or the top and bottom to the solid border, thus dividing the field into two relatively flexible or yieldable wings which can give under pressure, without rupture from the solid border. Said slots may be in the form of an inverted T (⊥); or an I, or a square U for example. They permit flexible yielding of the field area and also allow for thermal and other forms of expansion and contraction. The invention also includes connection of one or more of said slots to ports in the corners of the plate for more efficient drainage.

It will be understood that the foregoing general description and the following detailed description as well are exemplary and explanatory but are not restrictive of the invention.

Referring now in detail to the present preferred embodiments shown by way of illustration on the accompanying drawings, it will be clear that the invention is designed to accommodate itself to substantially any standard filter press construction so far as the supporting framework and the assembling and tightening devices are concerned. The plates which constitute the major working units of the mechanism in forming the assembled press are separated by externally rectangular frames 15 of "Bakelite" or similar plastic, preferably laminated with kraft paper, cloth or the like, or of other material with equivalent chemical and mechanical properties, said frame being preferably integral or solid throughout its rectangular extent so that, in accordance with the invention, all cracks, seams and leakage openings therethrough are avoided.

Suitable inlet holes or eyes 16 are formed in the upper corner or corners of the frames 15 in known manner for the admission of slurry or liquid to be filtered. Either or both of the lower corners of frame 15 are similarly apertured at 17 to provide drainage channels or conduits for the discharge of filtrate, communication thereto from the lower ends of the vertical drainage channels in the drainage grids being provided as hereinafter described.

Figure 2:
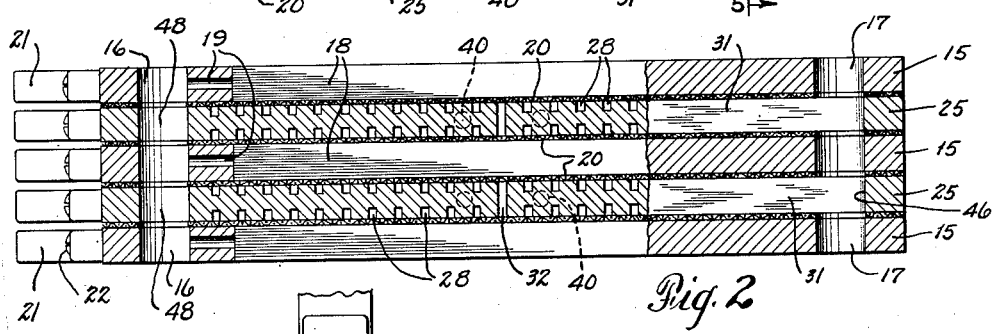
Fig. 2 is a horizontal section on line 2—2 of Fig. 1.

As shown in Figs. 1 and 2, the rectangular frames 15 serve the conventional purpose of separating filter plates in the filter press so as to form hollow spaces or chambers into which the liquid to be filtered is fed for filtration. Such chambers or spaces are indicated by the reference numeral 18 and a conventional type of port 19 is provided for feeding thereto slurry or other liquid to be filtered from the conduit formed by the contiguous eyes 16 of the several frames. Filter plates are positioned between adjacent frames 15 in the conventional manner and between the vertical surfaces of said plates and the adjacent frames are suspended sheets of filter media, such as filter cloth 20.

The outer vertical side edges of the frames 15, as well as the filter plates, are preferably provided with hanger handles 21 which support the frames on side bars or runners of the press in conventional manner. Said hangers, as shown, comprise ears or lugs formed preferably of the same material as the frames 15 and are secured to the edges of the frame by counter-sunk screws or lugs 22 and lower pins 23. In certain cases the invention contemplates using moldable plastic materials, such as "Lucite" or "Plexiglas," as the material of the plates and frames. The design of supporting hangers 21 provided for the use of a bearing surface pin 23 of harder material, such as "Bakelite" in cases where the relatively soft plastics are used to form the plates and frames themselves.

Referring now to the construction of the filter plates which are positioned between the frames 15 as shown in Figs. 1 and 2, said plates comprise generally an external rectangular frame or border portion 25 which is of the same external dimensions and shape as the separating frames 15. The other major portion of the plate comprises the interior drainage grid or field portion generally designated as 27 and described in detail later. Border portion 25 may be formed of the same materials as the frames 15 and is preferably also an integral solid continuous element which may be sawed out of a solid block of laminated "Bakelite," or molded or otherwise formed, it being understood that the solid integral construction of said border portion is a desirable and useful feature in overcoming leakage of fluids from the interior of the press.

In accordance with the principles disclosed and claimed in said Van Winkle Patent No. 2,390,628, said border portion 25 of the filter plates is preferably made to have smaller internal dimensions than the separating frames 15. Thus, as shown in Figs. 4 and 5, the depth of the tops and bottoms of the frames 15 may be greater than the corresponding portions of the adjacent plate border 25 so as to provide an overlap of bearing surface between the faces of the frames and the junction of the border and drainage grid or field portions 27 of the plates. This arrangement further insures against leakage in the press, reduces damage to the filter medium because of the wide bearing surface, and also acts to transmit the entire mechanical stress of closing the press through the frames and solid portions of the plate borders 25 while holding the field portions 27 of said plates in position without exerting undue stress thereon. While in practice the vertical internal dimensions of the frames 15 are preferably less than those of the plate borders as shown in Figs. 4 and 5, this arrangement may also be provided laterally, as shown in Fig. 1, where the vertical side members of the frames 15 overlap the corresponding portions of the plate borders 25.

In accordance with the invention, the interior drainage grid or field 27 of the filter plate is designed to permit expansion and contraction with respect to the solid border portion 25 and also to have a certain amount of "give" or flexibility with respect to said solid border portion. Said drainage field comprises a rectangular area within the borders of the external border 25 and normally constitutes an area which is co-planar with the faces of the border portion and preferably constitutes an integral part of the same block or casting of material. Said drainage grid is provided with suitable grooves or ducts for the flow of filtrate which passes through the filter media 20 and then travels down the face of the grid to discharge. As shown, said grooves are preferably evenly spaced vertical cuts or indentations 28 in the surface 27 of the drainage portion and extend from the top of the bottom of said portion. While shown as of uniform depth, they may, in accordance with the principles of De Lisle Patent Re. 22,520, vary in depth from top to bottom of the plate so as to provide increasing flow capacity for filtrate.

In accordance with the invention, the drainage grid 27 is partially separated from the solid border 25 by means of slots which penetrate through the entire body of material of which the plate is formed—that is, from face to face thereof. Such slots are provided as means for accomplishing the internal expansibility of the drainage grid; to provide for the limited flexibility or relative movement between the drainage field and the solid border; and also to provide drainage conduits for discharge flow of filtrate from the grid. One form of such slot arrangement is shown in Fig. 1 comprising the top transverse horizontal slot 30 which extends from one side to the other of the rectangular drainage grid area 27, a similar bottom horizontal slot 31, and the interconnecting central vertical slot 32 which runs from the top to the bottom of the drainage grid portion. As will be clear from the drawings these slots form essentially the shape of an I.

In the modification shown in Fig. 6 the upper horizontal slot 30 is omitted, but the bottom slot 31 and the central vertical slot 32 are retained so that the combination of slots forms an inverted T (⊥).

A third modification of the invention is shown in Figs. 11 and 12, where the vertical slots 35 and 36 are formed along the sides of the drainage field 27 and communicate with the bottom transverse slot 31 to form the combined slot shape of a square U. In some cases, as with the larger plates, this form may be further modified by providing one or more internal vertical slots 37 so as to divide the drainage field into a plurality of panels integrally connected to the solid border 25 across their tops and otherwise free or floating with respect to said border portion.

In Fig. 11 for purposes of illustration the drainage channels or grooves 28 are shown in dot and dash lines.

In the case of all the forms of the invention here shown, it will be understood that the arrangement of slots is such as to provide for internal expansibility and contractibility of the drainage field with respect to the solid border portion. Also the slots make possible a considerable amount of floating or relative movement of the panels of the drainage field with respect to the solid border portion of the plate and with respect to the compressibly fixed plate borders and frames when the press is assembled and in operation. Thus the invention provides a filter plate made from an integral block or sheet or mass of material which possesses most of the desirable characteristics found heretofore only in plates having removable interior grid panels or sections. It will be understood that plates made according to the present invention are relatively very simple to construct and avoid a very considerable amount of machining labor because they are formed so simply from a single piece of material.

In some cases it may be desirable to control the amount of flexible movement of the wings or panel portions of the plate with respect to the border portions thereof. Means for so doing is shown in Fig. 1 where dowels 40 may be passed through the solid border portions 25 of the top and bottom of the plate and project into suitable recesses in the top and bottom portions of the drainage grid adjacent the lines where the greatest movement of the panels might take place. Similarly, if desired, horizontal dowels could be employed, as for example in the lower external corners of the panels in the form of Fig. 11. Ordinarily, however, the use of such dowels will be found unnecessary and is to be avoided as a relatively expensive complication of the inventive arrangement.

The bottom slot 31 may in all cases serve the additional function of a discharge or drainage conduit for filtrate delivered thereto by the vertical grooves 28. Said slot 31 extends the width of the drainage field and as shown in Figs. 1 to 6 and 11 is designed to communicate directly with the eyes or transverse ports 45 and 46 at the lower corners of the plate. Said communication is preferably effected by lateral extension of the slot 31 itself. This arrangement provides for a very free discharge flow filtrate from the drainage area. It has the further advantage that cross-channels on the surface of the drainage grid for purposes of desirable flow are avoided and those sharp corners and indentations formed thereby and which injure filter media are eliminated. Obviously the use of the slot 31 for discharge purposes provides a far greater capacity for drainage than normally exists by the use of transverse slots similar in depth to the vertical slots 28 as has heretofore been common practice. One major advantage of this is that for a given capacity a plate can be made considerably thinner than when the customary surface groove or bored conduit is used for discharge. Also such slots are more readily prevented from clogging or may be easily cleaned out when they clog.

The upper corners of the solid border portion 25 of the filter plates are also provided with transverse eyes or ports 38 and 49 alined to communicate with the feed ports 16 of the frames 15. Where a washing action of the filter press is desired by the introduction of wash water at the top of the press, the transverse slot 30 of the form shown in Fig. 1 will serve as a conduit for that purpose, acting generally like the drainage conduit 31 previously described.

While inlet ports 19 are shown in connection with the form of Fig. 1 for the slurry feed from ports 16, the invention also contemplates the use of transverse slots 50 cut entirely through the frame and communicating with the ports 16 as shown in Fig. 10. This arrangement also avoids clogging and interruptions of filtration without in any way impairing the strength or efficiency of the press. It also affords much simpler construction for manufacture, permits easier cleaning and, being located in the bearing area, is not readily entered by the filter cloth.

While normally it is desirable to employ overlapping frames 15 covering the split bearing area between the solid border 25 and the floating field 27 of the plates (Figs. 1 to 5), a modified arrangement is shown in Fig. 9 where said overlap is avoided except at key points. For example, the frame 15a may be of the same internal dimensions as the plate border portion 25 except at points where it is desired to exert restraining force against undue floating movement of the drainage grid panels. For that purpose a depending ear or lug 55 may be formed along the inner upper edge of the frame 15a so as to overlap the upper corners of the I slotted drainage grid as shown. Similar ears or lugs may be provided at the equivalent locus in the bottom of the frame and elsewhere as may be needed.

The invention in its broader aspects is not limited to the specific mechanisms shown and described but departures may be made therefrom within the scope of the accompanying claims without sacrificing its chief advantages.

What I claim is:

1. As an article of manufacture a filter-press plate formed of a single, integral, flat rectangular block of laminated plastic, said block being formed with an external smooth border portion and an interior rectangular drainage field portion, the drainage field being grooved on both sides with a plurality of spaced drainage grooves running from the top to the bottom of the field, the field portion being separated from the border portion along its side edges and bottom edge by a continuous rectangular U-shaped slot through the block and the top edge of the field being integral with the upper border portion, whereby said field comprises a rectangular tongue within the border portion and has limited pivotal movement relative thereto.

2. A plate as defined in claim 1 wherein the bottom portion of said U-shaped slot forms a transverse drainage channel for both sides of the field, and a drainage port connected to said transverse channel.

HAROLD A. TEALE.

REFERENCES CITED

The following references are of record in the file of this patent:

UNITED STATES PATENTS

| Number | Name | Date |
|---|---|---|
| 996,537 | Sweetland | June 27, 1911 |
| 1,049,715 | Hopkins | Jan. 7, 1913 |
| 1,152,772 | Wheeler | Sept. 7, 1915 |
| 1,316,465 | Stone | Sept. 16, 1919 |
| 2,390,628 | Van Winkle | Dec. 11, 1945 |

FOREIGN PATENTS

| Number | Country | Date |
|---|---|---|
| 403,915 | France | Nov. 18, 1909 |
| 124,974 | Great Britain | Apr. 10, 1919 |
| 332,163 | Germany | of 1921 |